Figure 1:
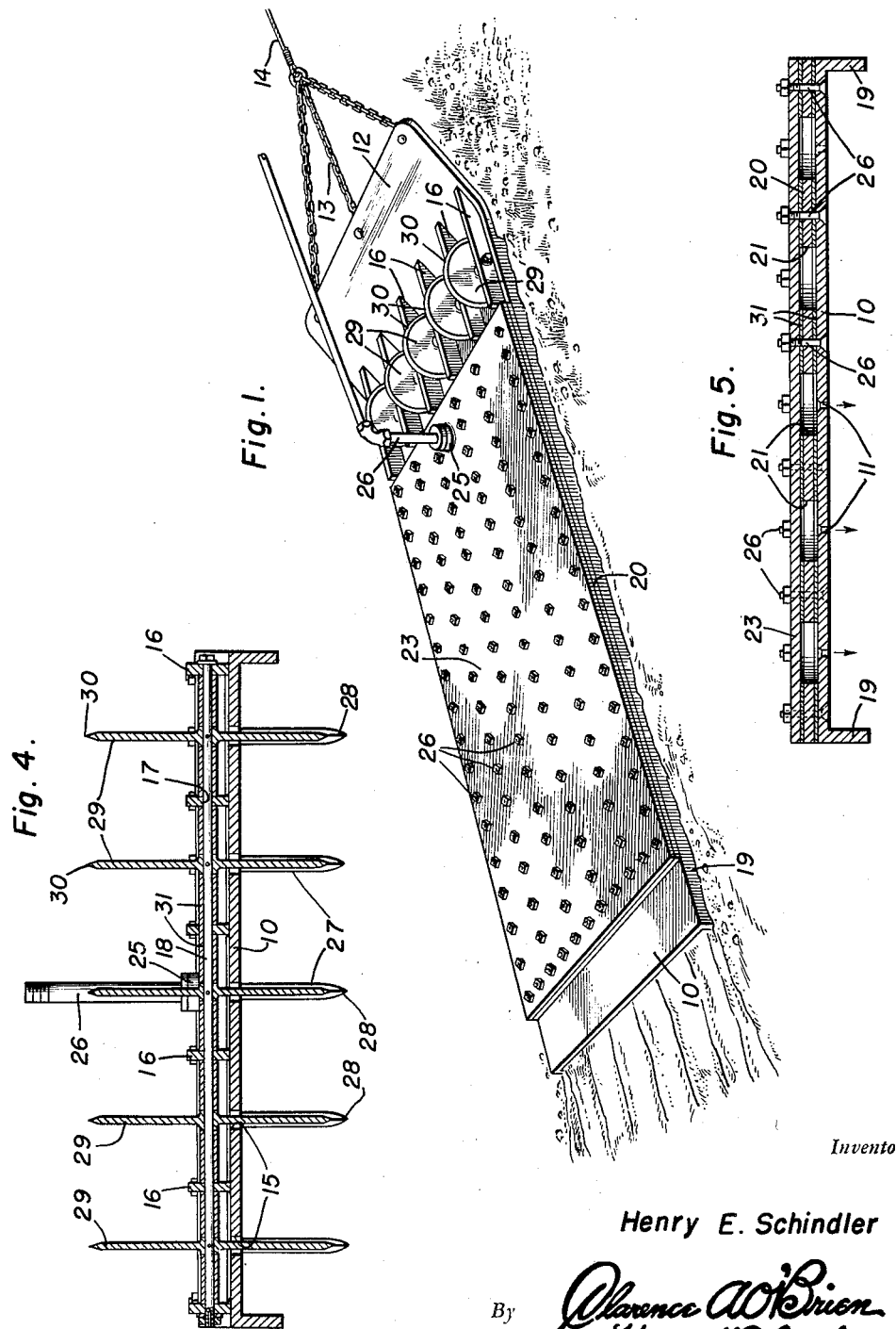

July 18, 1950  H. E. SCHINDLER  2,515,317
EARTHWORKING AND TREATING IMPLEMENT
Filed May 29, 1947  2 Sheets-Sheet 2

Inventor
Henry E. Schindler
By Clarence A. O'Brien
and Harvey B. Jacobson
Attorneys Patented July 18, 1950

2,515,317

UNITED STATES PATENT OFFICE 2,515,317

EARTH WORKING AND TREATING IMPLEMENT

Henry E. Schindler, Sisseton, S. Dak.

Application May 29, 1947, Serial No. 751,169

5 Claims. (Cl. 111—7)

1

This invention relates to an earth working and treating implement and has for its primary object to inject a treating fluid in the soil, preparatory to planting or the like.

Another object is to destroy quack grass, weeds and insects which may have found harbor in the soil immediately beneath its surface.

A still further object is to loosen and work the soil, and to inject the treating fluid in the soil immediately after its loosening and working.

The above and other objects may be attained by employing this invention which embodies among its features a drag adapted to be advanced along the surface of the earth, said drag having downwardly directed fluid discharge orifices opening through its bottom, means on the drag adjacent its forward end to open the surface of the earth over which the drag is advanced and means for conducting an earth treating fluid to the orifices for discharge therefrom and injection into the earth opened by the earth opening means.

Other features include a depending side flange along each longitudinal edge of the drag for confining the treating fluid to the earth lying beneath the drag, a transverse row of spaced earth opening knives mounted on the drag adjacent its forward end to open the surface of the earth over which the drag is advanced, and a transversely extending row of spaced stalk and root cutting disks mounted on the drag in advance of the knives.

Figure 2:
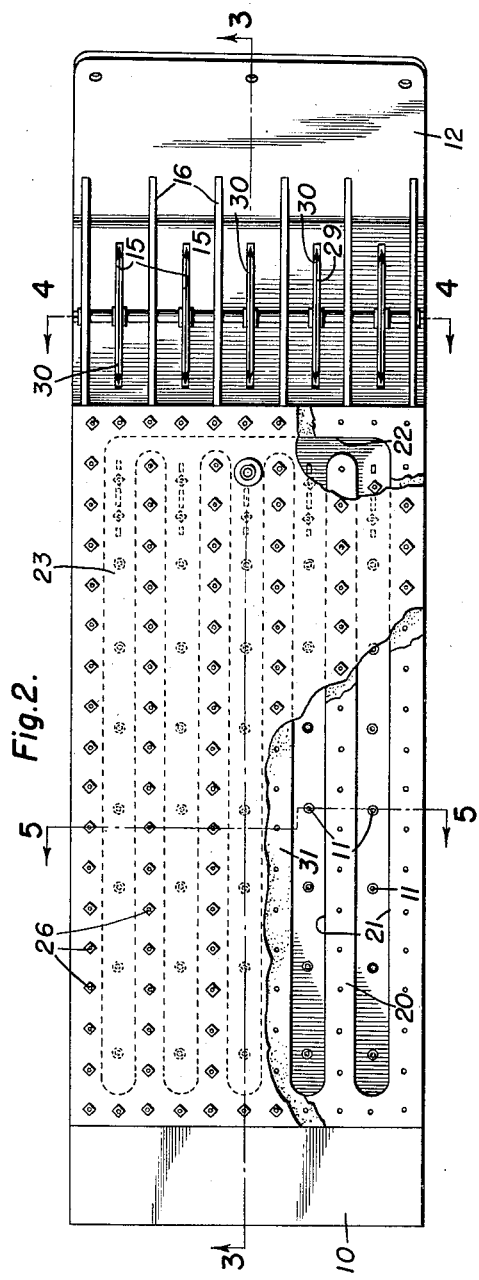
Figure 3:
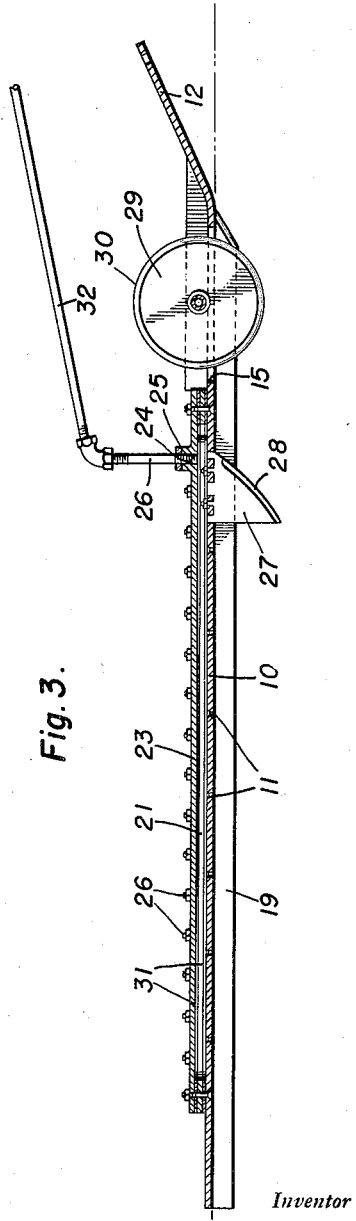

In the drawings,

Figure 1 is a perspective view of an earth opening and treating implement embodying the features of this invention, Figure 2 is a top plan view thereof, certain portions being broken away more clearly to illustrate certain details of construction, Figure 3 is a longitudinal sectional view taken substantially along the line 3—3 of Figure 2, Figure 4 is an enlarged sectional view taken substantially along the line 4—4 of Figure 2, and Figure 5 is a transverse sectional view on a somewhat enlarged scale taken substantially along the line 5—5 of Figure 2.

Referring to the drawings in detail, a shoe plate 10 is provided at spaced intervals with orifices 11 which project through the bottom thereof as will be readily understood upon reference to Figure 5. Formed at the forward end of the shoe plate 10 is an upwardly inclined extension 12 to which a tow chain 13 is attached for coupling to a towing cable 14 which is connected to any suitable traction vehicle, such as a farm

2 tractor. Formed in the shoe plate 10 adjacent the upturned extension 12 is a transverse row of spaced longitudinally extending slots 15 the purpose of which will be more fully hereinafter explained. Extending upwardly from the upper surface of the shoe plate 10 adjacent the upwardly inclined portion 12, and between the slots 15 are spaced parallel reinforcing and bearing supporting members 16 which are provided with aligned apertures 17 for the reception of a transversely extending supporting shaft 18, the purpose of which will be more fully hereinafter explained. Depending from the shoe plate 10 along opposite longitudinal edges are flanges 19 which as illustrated in Figure 1, are adapted to be slightly imbedded in the surface of the earth being treated to form a substantially fluid-tight junction therewith. Seated on the upper face of the shoe plate 10 is a spacer plate 20 which is provided with spaced parallel longitudinally extending slots 21 opening therethrough and which are joined adjacent one end with a transversely extending slot 22. As illustrated in Figure 2, the slots 21 are arranged to communicate with spaced parallel rows of the openings 11, and seated on the upper side of the spacer plate 20 is a cover plate 23 which serves to close the open upper sides of the slots 21 and thus form a plurality of spaced parallel passages which communicate with one another through the slot 22. Opening into the cover plate 23 adjacent its forward end is an internally screw-threaded orifice 24 surrounded by an internally screw-threaded boss 25 into which is threaded a feed pipe 26 for the fluid used in the treatment of the earth. The cover plate and spacer plates are held in proper position on the shoe plate 10 by means of bolts 26, the heads of which are countersunk in the bottom of the shoe plate 10 so that it will present a smooth unbroken surface to the earth over which the device is dragged.

Bolted or otherwise rigidly secured to the underside of the shoe plate 10 is a transversely extending row of spaced knives 27 the forward sharpened edge 28 of each of which curves rearwardly and downwardly as will be readily understood upon reference to Figure 3. It will thus be seen that as the drag thus produced is advanced along the surface of the earth, the knives 27 will serve to loosen the earth so that when fluid under pressure is introduced into the pipe 26, it will be discharged through the openings or orifices 11 and injected into the loosened soil.

In order that the roots and stalks of vegetable matter lying adjacent the surface of the earth to be treated may be cut preparatory to the loosening of the earth by the knives 27 I mount on the shaft 18 previously referred to a series of spaced disks 29, the edges 30 of which are sharpened to facilitate the cutting of the stalks and roots. These disks 29 are held in proper spaced relation on the shaft 18 by suitable tubular spacers 31 which lie between the hubs of the disks and the adjacent reinforcing members 16. The disks 30 project downwardly through the slots 15 and consequently, are located in advance of the knives 27. Obviously, suitable gaskets 31 may be interposed between the plates 10, 20 and 23 in order to effect a fluid-tight junction between the plates.

In use, with the plates assembled as indicated in the drawings and previously described, the complete drag is coupled to any suitable tractor through the medium of the flexible member 14, and the pipe 26 is coupled as by pipe 32 to a suitable source of treating fluid. The treating fluid may be live steam, and upon advancing the drag along the surface of the earth it will be evident that the disks 29 will cut the stalks and roots of vegetable matter while the knives 27 following in the grooves made by the disks 29 will serve to loosen the soil immediately beneath the roots and stalks. With the orifices 11 arranged in parallel rows, which align with the knives and disks 27 and 29 respectively it will be evident that the treating fluid or steam which is directed into the passages in the drag through the pipe 26 will be discharged through the orifices 11 and injected into the earth opened by the disks and knives. By thus injecting the steam into the earth it will be evident that any weeds or other vegetable matter, as well as insects and the like, will be destroyed by the sterilizing effect of the heated vapor. At the same time, the productivity of the earth so treated will in no way be impaired for the reason that as soon as the heat of the steam is dissipated its destructive effect is eliminated. Obviously, if so desired, any treating fluid, such as a liquid or gaseous fertilizer may be introduced into the earth through the use of the apparatus just described, when the conditions so warrant.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. An earth working and treating drag adapted to be advanced in contact with the surface of the earth comprising an earth contacting shoe plate having fluid discharge orifices opening therethrough, means carried by the shoe plate adjacent its forward end to open the surface of the earth over which it is advanced and means for directing earth treating fluid downwardly through the orifices for injection into the earth opened by the earth opening means.

2. An earth working and treating drag adapted to be advanced in contact with the surface of the earth comprising an earth contacting shoe plate having fluid discharge orifices opening therethrough, means carried by the shoe plate adjacent its forward end to open the surface of the earth over which it is advanced, means for directing earth treating fluid downwardly through the orifices for injection into the earth opened by the earth opening means, and a depending side flange along each longitudinal edge of the shoe plate for cooperation with said shoe plate in forming a hood which confines the treating fluid to that area of the earth which lies beneath the drag.

3. An earth working and treating drag adapted to be advanced in contact with the surface of the earth comprising an earth contacting shoe plate having fluid discharge orifices opening therethrough, an upwardly inclined extension at the forward end of the shoe plate, a transverse row of spaced earth opening knives carried by the shoe plate adjacent the extension to open the surface of the earth over which the shoe plate is advanced, and means for directing earth treating fluid downwardly through the orifices for injection into the earth opened by the earth opening knives.

4. An earth working and treating drag adapted to be advanced in contact with the surface of the earth comprising an earth contacting shoe plate having fluid discharge orifices opening therethrough, an upwardly inclined extension at the forward end of the shoe plate, a transverse row of spaced earth opening knives carried by the shoe plate adjacent the extension to open the surface of the earth over which the shoe plate is advanced, means for directing earth treating fluid downwardly through the orifices for injection into the earth opened by the earth opening knives, and a group of spaced stalk and root cutting disks carried by the shoe plate in advance of the knives.

5. An earth working and treating drag adapted to be advanced along the surface of the earth for opening the earth and injecting treating fluid thereinto comprising a bottom shoe plate having a plurality of spaced discharge orifices opening through the bottom thereof, an upwardly inclined extension at the forward end of said shoe plate, a spacer plate having spaced parallel longitudinally extending slots opening therethrough and a transverse slot establishing communication between the longitudinal slots, the spacer plate being mounted on the upper side of the shoe plate with the slots in the spacer plate communicating with the orifices in the shoe plate, a cover plate on the spacer plate and closing the open upper sides of the parallel slots to form passages within the drag, earth opening means carried by the shoe plate adjacent the upturned extension and means for conducting earth treating fluid into the passages for discharge through the orifices and injection into the earth opened by the earth opening means.

HENRY E. SCHINDLER.

REFERENCES CITED

The following references are of record in the file of this patent:

UNITED STATES PATENTS

| Number | Name | Date |
|---|---|---|
| Re. 22,778 | Elliott | Aug. 13, 1946 |
| 992,140 | Anderberg | May 16, 1911 |
| 1,696,856 | Moran | Dec. 5, 1928 |
| 1,835,629 | Bingham | Dec. 8, 1931 |

FOREIGN PATENTS

| Number | Country | Date |
|---|---|---|
| 2,069 | Australia | of 1904 |